United States Patent

Yashiro et al.

[11] Patent Number: 5,968,708
[45] Date of Patent: Oct. 19, 1999

[54] OPTICAL RECORDING MEDIUM AND METHOD OF PRODUCING THE SAME

[75] Inventors: Toru Yashiro, Kamakura; Yutaka Ueda, Yokohama, both of Japan

[73] Assignees: Ricoh Company, Ltd., Tokyo, Japan; Yamada Chemical Co., Ltd., Kyoto, Japan

[21] Appl. No.: 08/784,961

[22] Filed: Jan. 16, 1997

Related U.S. Application Data

[63] Continuation of application No. 08/424,090, Apr. 19, 1995, abandoned.

[30] Foreign Application Priority Data

| Apr. 20, 1994 | [JP] | Japan | 6-104500 |
| Jun. 9, 1994 | [JP] | Japan | 6-151482 |
| Aug. 16, 1994 | [JP] | Japan | 6-214247 |

[51] Int. Cl.$^6$ .................................................. G11B 7/24
[52] U.S. Cl. .................. 430/270.1; 430/270.17; 430/270.19; 430/495.1; 430/945; 346/135.1
[58] Field of Search ................ 430/270.1, 270.17, 430/270.19, 495.1, 945; 346/135.1; 540/122, 129

[56] References Cited

U.S. PATENT DOCUMENTS

| 4,656,121 | 4/1987 | Sato et al. . |
| 4,711,798 | 12/1987 | Ueda et al. . |
| 4,714,667 | 12/1987 | Sato et al. . |
| 4,758,499 | 7/1988 | Abe et al. . |
| 4,767,693 | 8/1988 | Oba et al. . |
| 4,861,637 | 8/1989 | Ueda et al. . |
| 4,865,949 | 9/1989 | Yamamuro et al. . |
| 4,891,305 | 1/1990 | Oba et al. . |
| 4,915,997 | 4/1990 | Yamamuro et al. . |
| 5,045,440 | 9/1991 | Onorato et al. ................ 430/270.17 |
| 5,132,960 | 7/1992 | Hosokawa et al. . |
| 5,168,031 | 12/1992 | Buckingham et al. ................ 430/270 |
| 5,169,745 | 12/1992 | Yashiro et al. . |
| 5,213,947 | 5/1993 | Ueda et al. . |
| 5,238,722 | 8/1993 | Yashiro et al. . |
| 5,252,372 | 10/1993 | Yashiro et al. . |

*Primary Examiner*—Thorl Chea
*Attorney, Agent, or Firm*—Oblon, Spivak, McClelland, Maier & Neustadt, P.C.

[57] ABSTRACT

An optical recording medium has a substrate, and a light absorbing layer serving as a recording layer formed on the substrate. The light absorbing layer contains a metallophthalocyanine compound of formula (I):

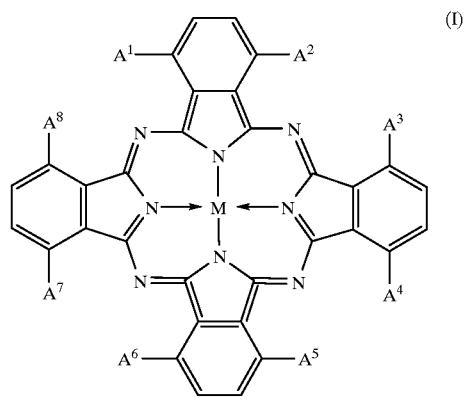

wherein M is Mn, Fe, Co, Zn or Cd; and either $A^1$ or $A^2$, either $A^3$ or $A^4$, either $A^5$ or $A^6$, and either $A^7$ or $A^8$ is —OR group or —SR group in which R is an aliphatic, aromatic or alicyclic hydrocarbon group, and the other is hydrogen; and a nitrogen-containing compound selected from the group consisting of an amino compound, an imino compound and an azo compound, each of which may have a substituent or form a ring.

14 Claims, 6 Drawing Sheets

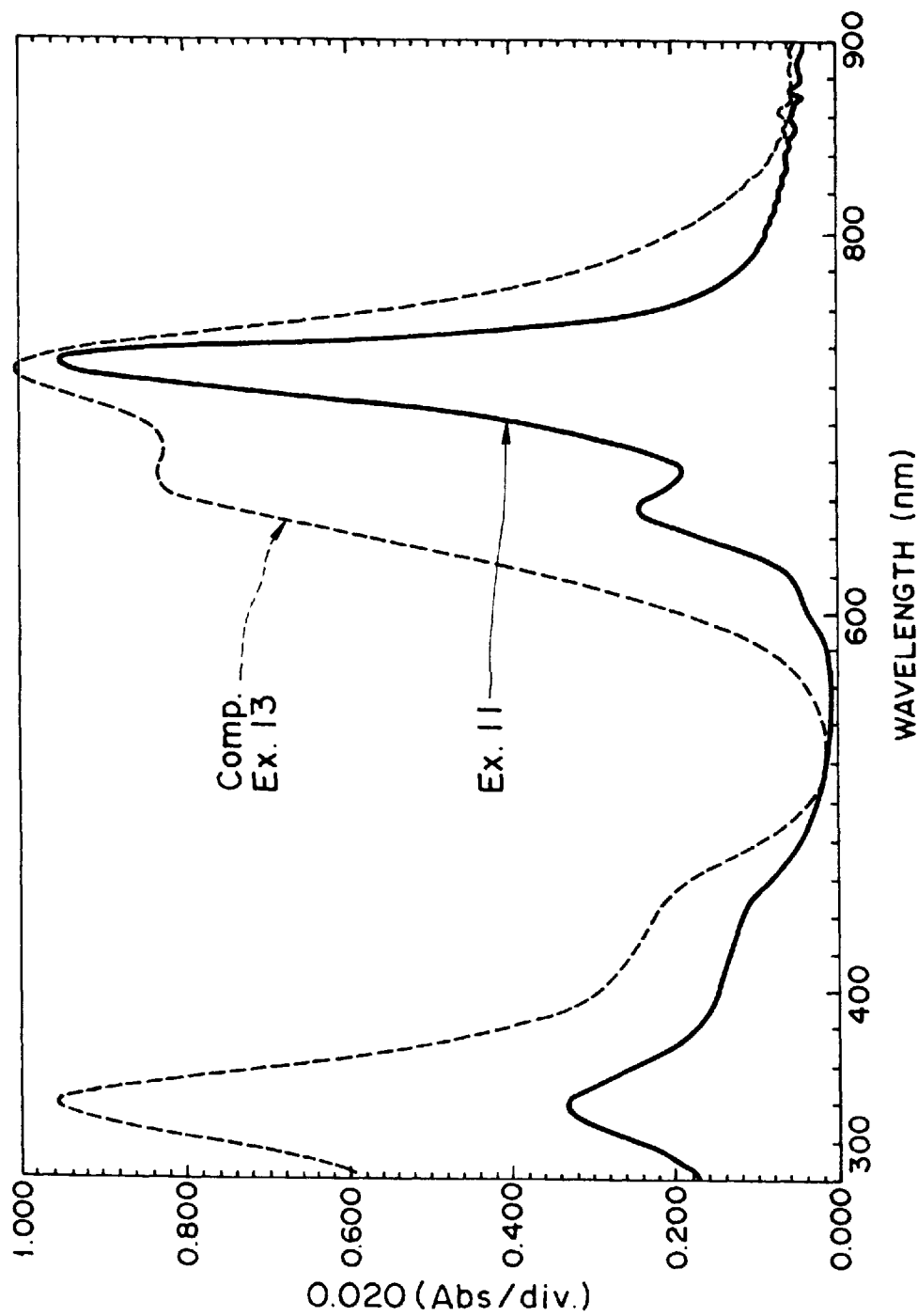

OPTICAL RECORDING MEDIUM AND METHOD OF PRODUCING THE SAME

This application is a continuation of application Ser. No. 08/424,090, filed on Apr. 19, 1995, now abandoned.

BACKGROUND OF THE INVENTION

1. Field of the Invention

The present invention relates to an optical recording medium and a method of producing the optical recording medium.

2. Discussion of Background

Recently overwrite type CDs (Compact Disks) have been actively developed. This is because the overwrite type CDs, unlike conventional CD, have the features that the user can record information therein as desired, and the recorded information can be reproduced therefrom by use of a commercially available CD player since the signals recorded in the overwrite type CDs satisfy the conventional CD standards for signals for recording.

An example of such an overwrite type CD is proposed in Japanese Laid-Open Patent Application 2-42652. This overwrite type CD comprises a substrate, a light absorbing layer which is provided by the spin coating of a dye on the substrate, and a metal reflection layer provided on the back side of the substrate opposite to the light absorbing light.

Another example of such an overwrite type CD is proposed in Japanese Laid-Open Patent Application 2-132656. This overwrite type CD comprises a light absorbing layer comprising a dye and is caused to satisfy the conventional CD standards for signals for recording by appropriately selecting the double refractive index and thickness of the light absorbing layer.

The overwrite type CD using dyes as disclosed in Japanese Laid-Open Patent Applications 2-42652 and 2-132656, however, do not have a sufficient light resistance for use in practice. To be more specific, these overwrite type CDs have the shortcoming that the signal characteristics thereof change, when exposed to sun light for an extended period of time, to such an extent that they cannot satisfy the conventional CD standards. This is because the properties of the dye materials used in the light absorbing layers thereof, in particular, conventional cyanine dyes, are changed when exposed to light.

In order to control such changes in the properties of the dye materials, it has been proposed to contain a light stabilizer in the light absorbing layer as disclosed in Japanese Laid-Open Patent Application 63-159090. However, when the content of the light stabilizer in the light absorbing layer is small, for instance, less than 20 wt. %, a sufficient light resistance for use in practice cannot be obtained, while when the content of the light stabilizer in the light absorbing light is large, for instance, 20 wt. % or more, the optical and/or thermal characteristics of the light absorbing layer are changed and the signal recording and reproduction characteristics of the light absorbing layer deteriorate in many respects.

As another means for improving the light resistance of the light absorbing layer, it is proposed as disclosed in Japanese Laid-Open Patent Applications 58-183296 and 58-37851 that a phthalocyanine compound, which is a dye with high light resistance, be employed as a material for the light absorbing layer. However, the solubility of the phthalocyanine compound in a solvent is too poor to form a film of the phthalocyanine compound by spin coating. In addition, it is difficult to obtain the optical characteristics required for the light absorbing layer, in particular, high refractive index, by use of such a phthalocyanine compound.

This is because the optical characteristics of the light absorbing layer depend upon the absorptivity coefficient of the layer (i.e. the absorbance per unit thickness of the layer) at a wavelength close to the wavelength of a laser beam used for recording and reproducing, so that there is required a sufficiently large absorptivity coefficient to satisfy the optical characteristics required for the overwrite type CD. However, a film layer of such a phthalocyanine compound has an absorptivity coefficient which is smaller than that of a film layer of the conventional cyanine dye. To be more specific, the absorptivity coefficient of the film layer of the phthalocyanine compound is about ⅓ to ½ that of the film layer of the cyanine dye.

SUMMARY OF THE INVENTION

It is therefore a first object of the present invention to provide an optical recording medium which comprises a light absorbing layer containing a phthalocyanine compound, with the light absorbing layer being provided with a sufficiently high light resistance, improved optical characteristics, and good film-forming properties.

A second object of the present invention is to provide a method of producing the above-mentioned optical recording medium, free from the problem of poor solubility of the phthalocyanine compound in a solvent.

The first object of the present invention can be achieved by an optical recording medium which comprises a substrate and a light absorbing layer formed on the substrate, the light absorbing layer comprising (i) a metallo-phthalocyanine compound of formula (I):

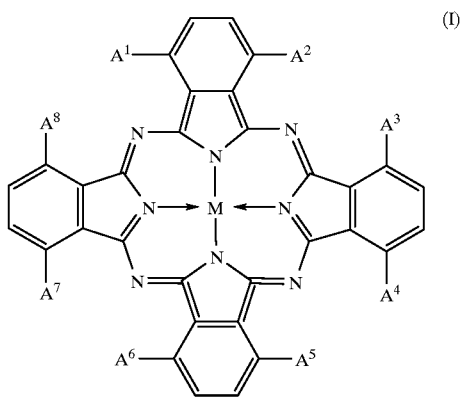

(I)

wherein M is Mn, Fe, Co, Zn or Cd; and either $A^1$ or $A^2$, either $A^3$ or $A^4$, either $A^5$ or $A^6$, and either $A^7$ or $A^8$ is —OR group or —SR group in which R is an aliphatic, aromatic or alicyclic hydrocarbon group, and the other is hydrogen; and (ii) a nitrogen-containing compound selected from the group consisting of an amino compound, an imino compound and an azo compound, each of which may have a substituent or form a ring.

In the above-mentioned optical recording medium, it is preferable that the substituent situated at one of the α-positions ($A^1$ or $A^2$, $A^3$ or $A^4$, $A^5$ or $A^6$, and $A^7$ or $A^8$) of each benzene ring of the phthalocyanine compound of formula (I) be a phenylthio group of the following formula (II):

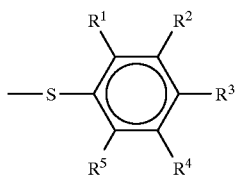

(II)

wherein $R^1$ is an alkyl group having 1 to 4 carbon atoms or an alkoxyl group having 1 to 4 carbon atoms; and $R^2$, $R^3$, $R^4$ and $R^5$ each is an alkyl group having 1 to 4 carbon atoms, an alkoxyl group having 1 to 4 carbon atoms, a halogen atom or hydrogen.

In addition, in the above-mentioned optical recording medium, it is preferable that the nitrogen-containing compound for use in the light absorbing layer be a compound in which a nitrogen atom is included in a heterocyclic ring. For example, it is preferable that the light absorbing layer comprise at least one nitrogen-containing compound selected from the group consisting of imidazole, benzimidazole and a thiazole derivative.

Furthermore, in the aforementioned optical recording medium of the present invention, it is preferable that the light absorbing layer exhibit a maximum light absorption peak ($\lambda$max) in a wavelength range of 710 to 750 nm, more preferably in a wavelength range of 720 to 740 nm.

The second object of the present invention can be achieved by a method for fabricating an optical recording medium comprising a substrate and a light absorbing layer formed on the substrate, the light absorbing layer comprising (i) a metallo-phthalocyanine compound of formula (I) and (ii) a nitrogen-containing compound, which method comprises the step of providing the light absorbing layer on the substrate by coating of a mixture comprising (i) the metallo-phthalocyanine compound of formula (I):

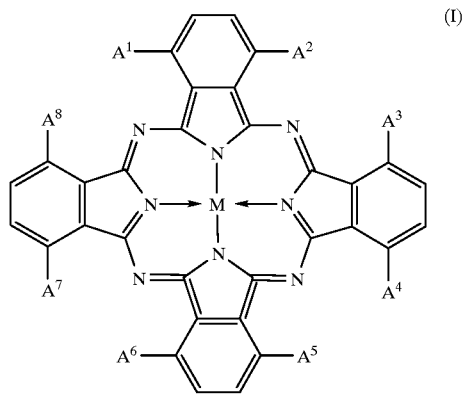

(I)

wherein M is Mn, Fe, Co, Zn or Cd; and either $A^1$ or $A^2$, either $A^3$ or $A^4$, either $A^5$ or $A^6$, and either $A^7$ or $A^8$ is —OR group or —SR group in which R is an aliphatic, aromatic or alicyclic hydrocarbon group, and the other is hydrogen; and (ii) the nitrogen-containing compound selected from the group consisting of an amino compound, an imino compound and an azo compound, each of which may have a substituent or form a ring.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 7 shows light absorption spectra of the light absorbing layers obtained in Example 11 and Comparative Example 13.

DESCRIPTION OF THE PREFERRED EMBODIMENTS

Figure 1:
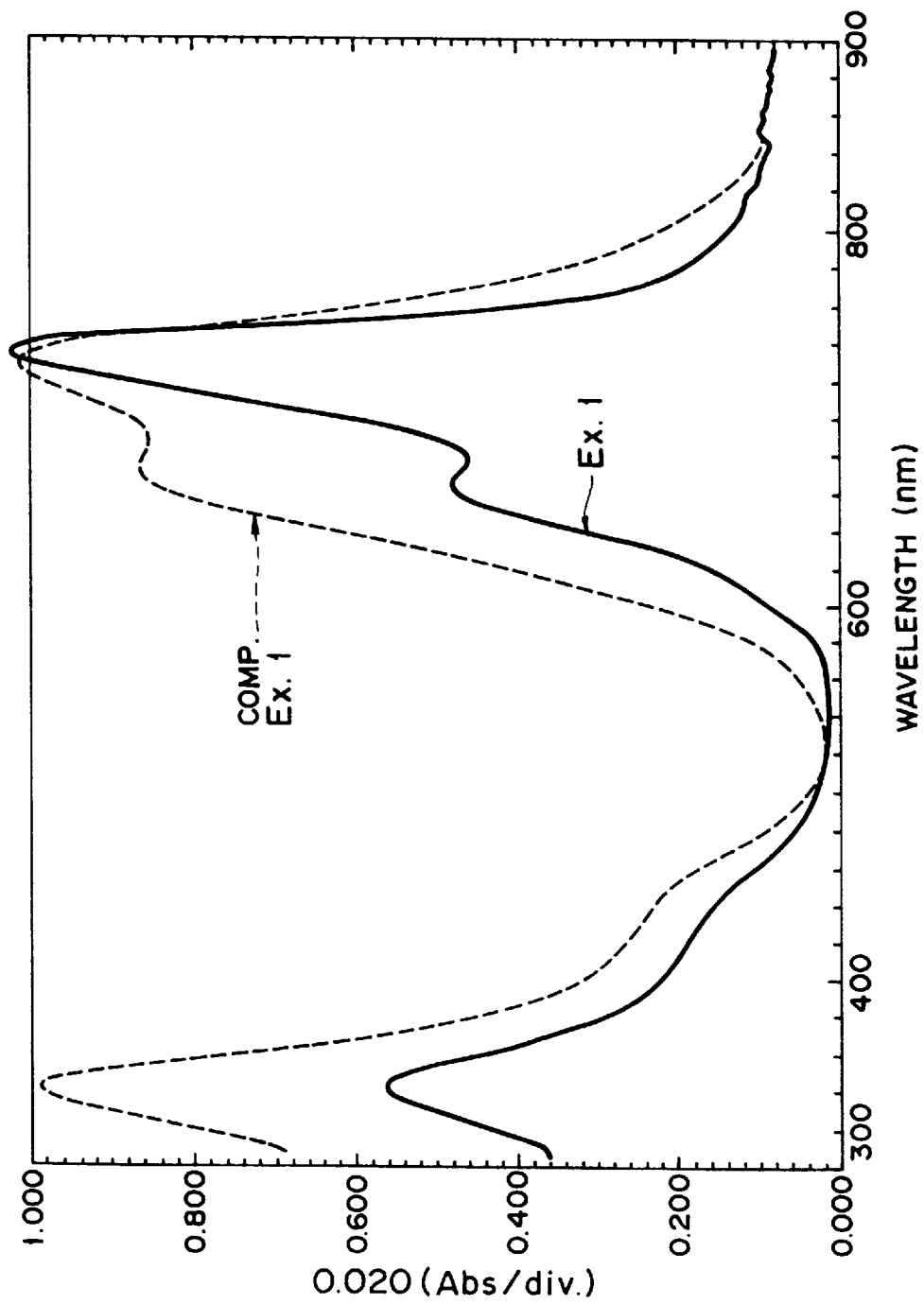
FIG. 1 shows light absorption spectra of the light absorbing layers obtained in Example 1 and Comparative Example 1.

The inventors of the present invention have completed the present invention based on the knowledge that the reasons why the absorptivity coefficient of a film layer of a phthalocyanine compound, serving as a light absorbing layer used in the conventional optical recording medium, is small are that the molecule of the phthalocyanine compound has a plane structure, so that the molecules of the phthalocyanine compound tend to be associated, and when the molecules of the phthalocyanine compound are associated, the solubility of the phthalocyanine compound in a solvent is decreased and the light absorption spectrum of the phthalocyanine compound becomes broad because of the mutual interaction of the molecules.

Furthermore, it has also been found that it is preferable that a maximum light absorption peak ($\lambda$max) of the light absorbing layer comprising a phthalocyanine compound appear in a wavelength range of 710 to 750 nm, more preferably in a wavelength range of 720 to 740 nm, in order to obtain a proper double refractive index at a wavelength of a laser beam, that is, in a range of 760 to 800 nm.

The optical recording medium according to the present invention comprises a substrate and a light absorbing layer formed therein, which comprises a mixture of the previously mentioned metallo-phthalocyanine compound of formula (I) and the nitrogen-containing compound selected from the group consisting of an amino compound, an imino compound and an axo compound, each of which may have a substituent or form a ring. In the present invention, therefore, the association of the molecules of the phthalocyanine compound can be inhibited in the light absorbing layer when the light absorbing layer is formed in a thin film on the substrate in such a fashion that the nitrogen-containing compound is coordinated and bonded to the metallo-phthalocyanine compound of formula (I). Consequently, the light absorption spectrum of the light absorbing layer for use in the present invention does not become broad, and the proper double refractive index of the light absorbing layer can be obtained at a wavelength close to the wavelength of the laser beam. In addition, the solubility of the metallo-phthalocyanine compound is improved, so that the film formation of the phthalocyanine compound of formula (I) can be achieved by spin coating.

In the light absorbing layer for use in the present invention, —N= group or —N< group of the nitrogen-containing compound tends to be coordinated to the central metal element M of the metallo-phthalocyanine compound of formula (I), so that such a nitrogen-containing compound enters between the molecules of the metallo-phthalocyanine compound, thereby inhibiting the association of the molecules thereof.

As previously mentioned, it has been confirmed that it is preferable that a maximum light absorption peak (λmax) of the light absorbing layer comprising a metallo-phthalocyanine compound appear in a wavelength range of 710 to 750 nm, more preferably in a wavelength range of 720 to 740 nm, in order to obtain a proper double refractive index of the light absorbing layer at a wavelength close to the wavelength of the laser beam. In the present invention, the maximum light absorption peak of the light absorbing layer can substantially appear in a wavelength range of 710 to 750 nm by the influence of —OR group or —SR group which is situated at one of the α-positions (either $A^1$ or $A^2$, either $A^3$ or $A^4$, either $A^5$ or $A^6$, and either $A^7$ or $A^8$) in each benzene ring of the phthalocyanine skeleton. When —SR group is the previously mentioned phenylthio group of formula (II) in the metallo-phthalocyanine compound of formula (I), the maximum light absorption peak of the light absorbing layer can substantially appear in a wavelength range of 720 to 740 nm, and the solubility of the phthalocyanine compound is increased to such a degree that the film formation of the phthalocyanine compound can be achieved by spin coating in a good condition.

In the present invention, the nitrogen-containing compound for use in the light absorbing layer is selected from the group consisting of an amino compound, an imino compound and an azo compound, each of which may have a substituent or form a ring. Each of those nitrogen-containing compounds has —N= group or —N< group in its molecule.

Specific examples of such a nitrogen-containing compound for use in the light absorbing layer are as follows: n-butylamine, n-hexylamine, t-butylamine, ethylenediamine, trimethylamine, dimethylformamide, N,N-dimethylformamide, pyrrole, pyrrolidine, imidazole, benzimidazole, methylbenzimidazole, dimethylbenzimidazole, 5,6-dimethylbenzimidazole, trimethylbenzimidazole, 2,5,6-trimethylbenzimidazole, pyridine, piperidine, carbazole, quinoline, isoquinoline, quinoxaline, benzo quinoline, phenanthridine, indoline, 7-azaindole, tetrahydroquinoline, benzotriazole, 5-chlorobenzotriazole, 5-chlorotriazole, triphenylimidazole, benz isoquinoline-5,10-dione, phthalimide, 1(2H) phthalazinone, N,N'-phthalylhydrazine, 1,3-diiminoisoindoline, tetrabromophthalimide, oxazole, benzoxazole, norharman, triazine, trichloroquinoxaline, azobenzene, 2-methylnaphthoimidazole, benzothiazole, perimidine, polybenzimidazole, polymimidazole and polythiazole.

Of the above-mentioned nitrogen-containing compounds, a nitrogen-containing compound in which a nitrogen atom is included in a heterocyclic ring is particularly preferable from the viewpoints of the association inhibition characteristics and the durability of the obtained light absorbing layer in terms of the heat and light resistance. For instance, imidazole, benzimidazole and a thiazole derivative are preferred. Furthermore, it is preferable that the nitrogen-containing compound have a melting point of 150° C. or more to maintain the thermostability of the light absorbing layer. In such a case, the properties of the light absorbing layer, in particular, the optical properties thereof can be maintained in a stable condition under the circumstances of high temperature.

In the metallo-phthalocyanine compound of formula (I), Mn, Fe, Co, Zn and Cd can be employed as the central metal element M. The previously mentioned —N= group or —N< group of the nitrogen-containing compound can easily be coordinated to such central metals, thereby effectively inhibiting the association of the molecules.

The metallo-phthalocyanine compound of formula (I) has the previously mentioned —OR group or —SR group at one of α-positions of each benzene ring of the phthalocyanine skeleton. In this case, R represents an aliphatic, aromatic or alicyclic hydrocarbon group, which preferably has 1 to 20 carbon atoms.

In addition to the previously mentioned OR group and SR group, other groups such as a halogen atom, nitro group, an alkyl group, an alkoxyl group and alkylthio group may be added to the aforementioned group R and each benzene ring of the phthalocyanine skeleton to control the light absorption wavelength of the light absorbing layer and improve the solubility of the metallo-phthalocyanine compound in a solvent in the formation of a coating liquid for the light absorbing layer.

As previously mentioned, it is preferable that the metallo-phthalocyanine compound of formula (I) have as a substituent a phenylthio group of the following formula (II) at one of the α-positions of each benzene ring of the phthalocyanine skeleton:

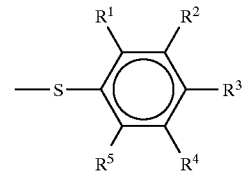

(II)

wherein $R^1$ is an alkyl group having 1 to 4 carbon atoms or an alkoxyl group having 1 to 4 carbon atoms; and $R^2$, $R^3$, $R^4$ and $R^5$ each is an alkyl group having 1 to 4 carbon atoms, an alkoxyl group having 1 to 4 carbon atoms, a halogen atom or hydrogen, and $R^1$ to $R^5$ may be the same or different.

The solubility of the metallo-phthalocyanine compound of formula (I), and the absorptivity coefficient and heat resistance of the obtained light absorbing layer can be improved by the above-mentioned substituents of $R^1$ to $R^5$ in formula (II). In particular, the substituents of $R^1$ and $R^5$ have a serious effect on the improvement of the above-mentioned properties.

It is preferable that the molar ration of the nitrogen-containing compound having the group —N= or —N< to the metallo-phthalocyanine compound of formula (I) be in a range of ½ to ⅔. When the above-mentioned molar ratio is satisfied in the light absorbing layer, the effects obtained by the nitrogen-containing compound are sufficient, the concentration of the dye in the light absorbing layer is appropriate, and the absorptivity coefficient of the light absorbing layer becomes sufficiently large.

As the materials for the light absorbing layer, not only the above-mentioned phthalocyanine compound, but also dyes which are conventionally employed as recording materials for conventional information recording media can be employed in the form of a mixture with the metallo-phthalocyanine compound of formula (I).

Examples of such dyes include cyanine dyes, pyrylium—thiopyrylium dyes, azulenium dyes, squarylium dyes, metal complex salt dyes such as Ni and Cr complex salt dyes, naphthoquinone—anthraquinone dyes, indophenol dyes, indoaniline dyes, triphenylmethane dyes, triarylmethane dyes, aminium—diinmonium dyes, and nitroso compounds.

When necessary, other third components such as a binder and a stabilizer may be contained in the light absorbing layer.

It is preferable that the thickness of the light absorbing layer be in a range of 100 to 5000 Å, more preferably in a range of 500 to 3000 Å. The decrease of recording sensitivity and the decrease of reflectance of the light absorbing layer can be prevented when the thickness of the light absorbing layer is within the above range.

As the substrate for use in the present invention, any materials used for the substrate of conventional information recording media can be employed.

Specific examples of the material for the substrate for use in the present invention include acrylic resin such as polymethyl methacrylate; vinyl chloride resin such as polyvinyl chloride and vinyl chloride copolymer; epoxy resin; polycarbonate resin; amorphous polyolefin; polyester; glass such as soda-lime glass; and ceramics.

In view of the dimensional stability, transparency, and flatness of the substrate, polymethyl methacrylate, polycarbonate resin, epoxy resin, amorphous polyolefin, polyester, and glass are particularly preferable as the materials for the substrate for use in the present invention.

An undercoat layer may be provided between the light absorbing layer and the substrate for improvement of the flatness of the substrate and the adhesion between the substrate and the light absorbing layer, and for prevention of the deterioration of the light absorbing layer.

Examples of the material for the undercoat layer include polymers such as polymethyl methacrylater, acrylic acid—methacylic acid copolymer, styrene—maleic anhydride copolymer, polyvinyl alcohol, N-methylolacrylamide, styrene—sulfonic acid copolymer, styrene—vinyltoluene copolymer, chlorosulfonated polyethylene, nitrocellulose, polyvinyl chloride, chlorinated polyolefin, polyester, polyimide, vinyl acetate—vinyl chloride copolymer, ethylene—vinyl acetate copolymer, polyethylene, polypropylene, and polycarbonate; organic materials such as silane coupling agents; and inorganic materials, for example, an inorganic oxide such as $SiO_2$ or $Al_2O_3$ and an inorganic fluoride such as $MgF_2$.

The thickness of such an undercoat layer is preferably in a range of 0.005 to 20 $\mu$m, more preferably in a range of 0.01 to 10 $\mu$m.

A pre-groove layer for forming therein grooves for tracking and/or address signals may be provided on the substrate or on the undercoat layer.

As the material for the pre-groove layer, a mixture of at least one monomer selected from the group consisting of monoester, diester, triester and tetraester of acrylic acid, or an oligomer thereof, and a photopolymerization initiator may be employed.

On the light absorbing layer, a light reflection layer may be provided to improve the S/N ratio, the reflectance and the recording sensitivity of the recording medium.

As a light reflective material for use in the light reflection layer, materials capable of exhibiting high reflectance with respect to the laser beam are employed. Examples of such materials include metals and metalloids, such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ca, In, Si, Ge, Te, Pb, Po, Sn, and Si.

Of these metals and metalloids, Au, Al and Ag are preferable as the materials for the light reflection layer. These materials may be used alone or in combination, or in the form of alloys.

The light reflection layer generally has a thickness of 100 to 3000 Å.

Such a light reflection layer may be interposed between the substrate and the light absorbing layer serving as the recording layer. In this case, recording of information and reproduction of the recorded information are carried out on the side of the light absorbing layer, which is opposite to the substrate.

A protective layer may be provided on the light absorbing layer or the light reflection layer in order to physically and chemically protect the light absorbing layer or the light reflection layer.

Such a protective layer may also be provided on the side of the substrate on which the recording layer is not provided in order to improve the resistance to scratches and the resistance to humidity of the recording medium.

As the material for the protective layer, for instance, inorganic materials such as SiO, $SiO_2$, $MgF_2$ and $SnO_2$; and resins such as a thermoplastic resin, a thermosetting resin and an ultraviolet curing resin can be employed.

The protective layer generally has a thickness of 500 Å to 50 $\mu$m.

The method for producing the optical recording medium of the present invention will now be explained.

To produce an optical recording medium according to the present invention, a light absorbing layer comprising as the main components the metallo-phthalocyanine compound of formula (I) and the previously mentioned nitrogen compound is directly provided on a substrate by coating method, on which substrate the information pits and/or guide grooves have been previously formed. Alternatively, other layers may be interposed between the light absorbing layer and the substrate.

Furthermore, a light reflection layer may be provided on the light absorbing layer directly or via other layers by vacuum-deposition, and a protective layer may be provided on the thus formed light reflection layer.

The method for fabricating the optical recording medium according to the present invention will be explained in detail step by step.

Formation of Light Absorbing Layer

The film formation of a light absorbing layer comprising as the main components the metallo-phthalocyanine compound of formula (I) and the previously mentioned nitrogen-containing compound is carried out by coating method, so that the light absorbing layer is directly or via other layers provided on a substrate on which the information pits and/or guide grooves have been previously formed. To be more specific, a coating liquid may be prepared by dissolving the previously mentioned metallo-phthalocyanine compound of formula (I) and nitrogen-containing compound in an appropriate solvent, and the coating liquid thus prepared may be applied to the substrate, so that the light absorbing layer can be provided on the substrate with no difficultly although the light absorbing layer for use in the present invention is a film in which the nitrogen-containing compound is coordinated and bonded to the phthalocyanine compound.

As the solvent used in the preparation of the above-mentioned coating liquid, conventional organic solvents such as alcohol, cellosolve, halogenated carbon, ketone and ether can be employed.

The light absorbing layer can be formed, for example, by the evaporation method, LB method, and spin coating method. Of these methods, the spin coating method is most preferable because the thickness of the light absorbing layer can be controlled as desired by adjusting the concentration and viscosity of the components for the formation of the light absorbing layer, and the drying speed of the solvent used for formation of the light absorbing layer.

In the case where the undercoat layer is provided between the substrate and the light absorbing layer, a coating liquid for the undercoat layer is prepared by dissolving or dispersing any of the previously mentioned materials for the undercoat layer in a proper solvent, and the coating liquid thus prepared is coated on the substrate by spin coating, dip coating or extrusion coating.

Formation of Light Reflection Layer

The light reflection layer may be formed on the light absorbing layer directly or via other layers by vacuum deposition. To be more specific, any of the previously mentioned light reflective materials may be deposited on the light absorbing layer by evaporation, sputtering or ion-plating.

Formation of Protective Layer

According to the present invention, the protective layer may be provided on the light reflection layer. To provide the protective layer, any of the previously mentioned inorganic materials and resins may be applied to the light reflection layer by vacuum-deposition or coating method. In particular, it is preferable that the UV-curing resin be applied to the light reflection layer by spin coating and cured by ultraviolet-light irradiation.

Other features of this invention will become apparent in the course of the following description of exemplary embodiments, which are given for illustration of the invention and are not intended to be limiting thereof.

EXAMPLE 1

A mixture of tetraalkylthio-Zn-phthalocyanine compound (A) as shown in Table 1 and 5,6-dimethylbenzimidazole with a molar ratio of 1:1 was dissolved in chloroform to prepare a coating liquid for the light absorbing layer.

The coating liquid thus prepared was coated on a disk-shaped glass substrate with a diameter of 120 mm and a thickness of 1.2 mm by spin coating, whereby a light absorbing layer was provided on the glass substrate, and an optical recording medium No. 1 of the present invention was fabricated.

A light absorption spectrum of the light absorbing layer of the above prepared optical recording medium No. 1 is shown in FIG. 1. As apparent from the graph, the absorption peak on the right side, which is a longer wavelength side, is high and sharp.

COMPARATIVE EXAMPLE 1

The tetraalkylthio-Zn-phthalocyanine compound (A) as shown in Table 1 was dissolved in chloroform to prepare a coating liquid for the light absorbing layer.

The coating liquid thus prepared was coated on a disk-shaped glass substrate with a diameter of 120 mm and a thickness of 1.2 mm by spin coating, whereby a light absorbing layer was provided on the glass substrate, and a comparative optical recording medium No. 1 was fabricated.

A light absorption spectrum of the light absorbing layer of the above prepared comparative optical recording medium No. 1 is shown in FIG. 1, which indicates that the absorption peak is broader than that of the light absorbing layer obtained in Example 1.

EXAMPLE 2

The procedure for fabricating the optical recording medium No. 1 of the present invention in Example 1 was repeated except that the tetraalkylthio-Zn-phthalocyanine compound (A) for use in the light absorbing layer coating liquid employed in Example 1 was replaced by tetraalkoxy-Zn-phthalocyanine compound (B) as shown in Table 1.

Thus, an optical recording medium No. 2 according to the present invention was fabricated.

Figure 2:
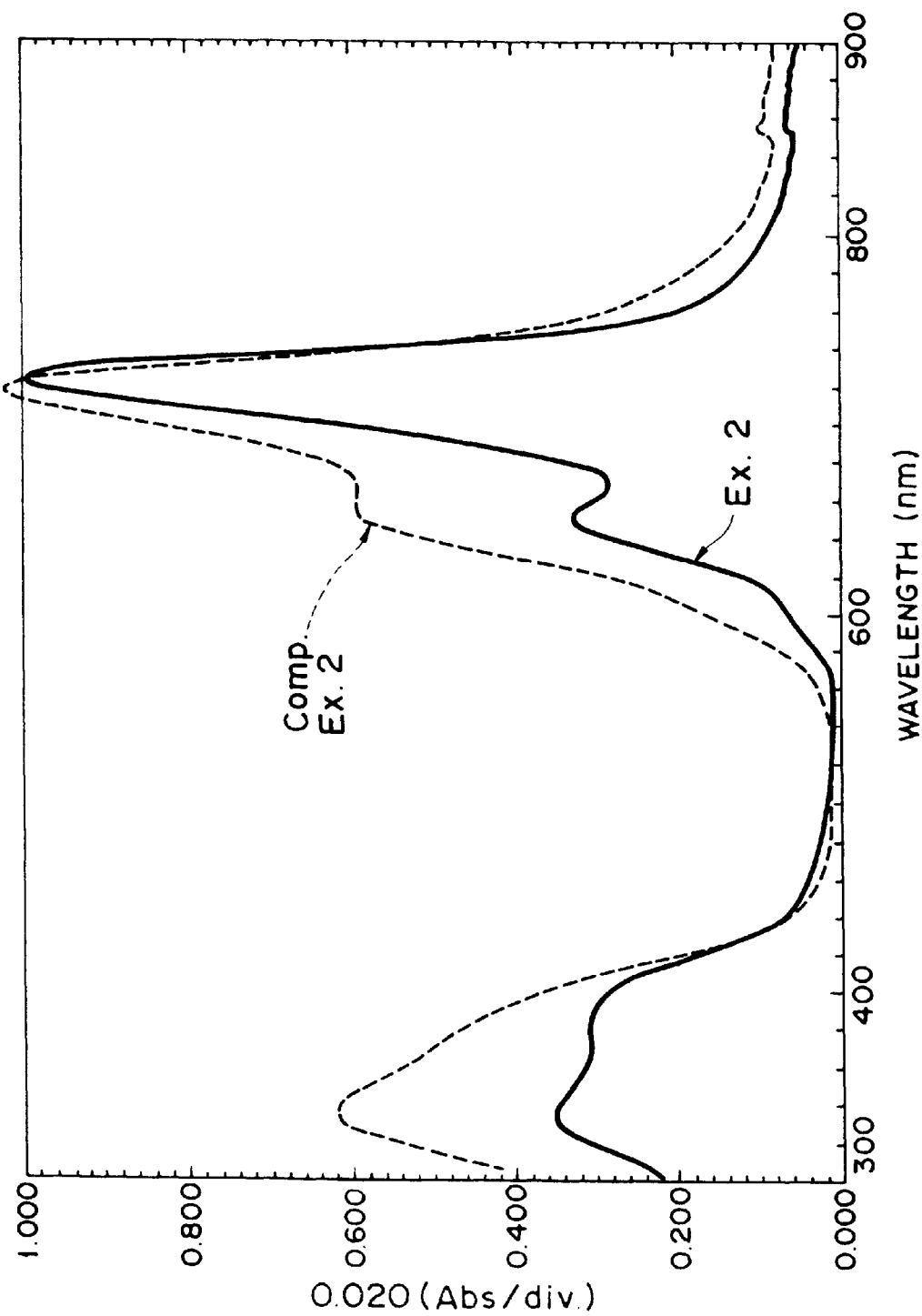
FIG. 2 shows light absorption spectra of the light absorbing layers obtained in Example 2 and Comparative Example 2.

A light absorption spectrum of the light absorbing layer of the above prepared optical recording medium No. 2 is shown in FIG. 2. As apparent from the graph, the absorption peak on the right side, which is a longer wavelength side, is high and sharp.

COMPARATIVE EXAMPLE 2

The procedure for fabricating the comparative optical recording medium No. 1 in Comparative Example 1 was repeated except that the tetraalkylthio-Zn-phthalocyanine compound (A) for use in the light absorbing layer coating liquid employed in Comparative Example 1 was replaced by tetraalkoxy-Zn-phthalocyanine compound (B) as shown in Table 1.

Thus, a comparative optical recording medium No. 2 was fabricated.

A light absorption spectrum of the light absorbing layer of the above prepared comparative optical recording medium No. 2 is shown in FIG. 2. As apparent from the graph, the absorption peak on the right side, which is a longer wavelength side, is broader than that of the light absorbing layer obtained in Example 2.

EXAMPLES 3 TO 6

The procedure for fabricating the optical recording medium No. 1 of the present invention in Example 1 was repeated except that the tetraalkylthio-Zn-phthalocyanine compound (A) for use in the light absorbing layer coating liquid employed in Example 1 was replaced by the respective metallo-phthalocyanine compounds (C) to (F) as shown in Table 1.

Thus, optical recording media Nos. 3 to 6 according to the present invention were fabricated.

COMPARATIVE EXAMPLES 3 TO 6

The procedure for fabricating the optical recording medium No. 1 of the present invention in Example 1 was repeated except that the tetraalkylthio-Zn-phthalocyanine compound (A) for use in the light absorbing layer coating liquid employed in Example 1 was replaced by the respective metallo-phthalocyanine compounds (G) to (J) as shown in Table 1.

Thus, comparative optical recording media Nos. 3 to 6 were fabricated.

Then, a maximum light absorption peak ($\lambda$max) of the light absorbing layer of each of the optical recording media obtained in Examples 1 to 6 and Comparative Examples 3 to 6 was measured. The results are shown in Table 1.

As can be seen from the results in Table 1, the maximum light absorption peak ($\lambda$max) of the light absorbing layer of each of the optical recording media obtained in Examples 1 to 6 is within a range of 710 to 750 nm. On the other hand, the maximum light absorption peak (λmax) of the light absorbing layer of each of the comparative optical recording media obtained in Comparative Examples 3 to 6 appears in a lower wavelength when compared with the maximum light absorption peak (λmax) of the light absorbing layer of each of the optical recording media according to the present invention.

COMPARATIVE EXAMPLES 7 TO 8

The procedure for fabricating the comparative optical recording medium No. 1 in Comparative Example 1 was repeated except that the tetraalkylthio-Zn-phthalocyanine compound (A) for use in the light absorbing layer coating liquid employed in Comparative Example 1 was replaced by the respective metallo-phthalocyanine compounds (G) and (I) as shown in Table 1.

Thus, comparative optical recording media Nos. 7 and 8 were fabricated.

Using the optical recording media No. 1, No. 2 and No. 4 according to the present invention obtained in Examples 1, 2 and 4, and the comparative optical recording media No. 1, No. 7 and No. 8 obtained in Comparative Examples 1, 7 and 8, the refractive index of each light absorbing layer at a wavelength close to the wavelength of a semiconductor laser beam was calculated form the reflectance of each light absorbing layer.

Figure 3:
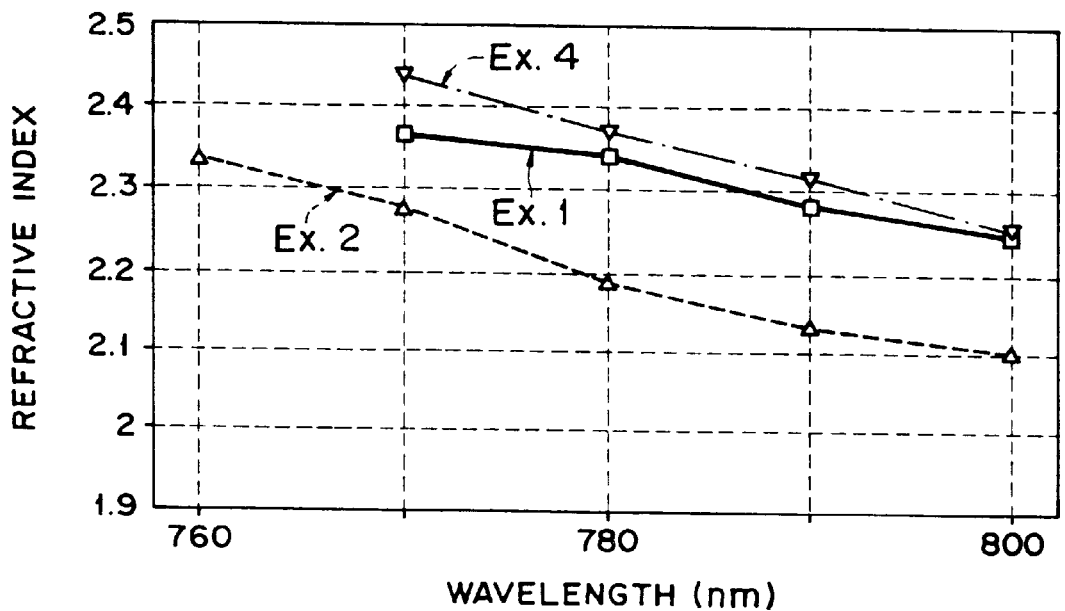
FIG. 3 is a graph which shows the relationship between the wavelength of the applied light and the refractive index of the light absorbing layers obtained in Examples 1, 2 and 4.

FIG. 3 shows the relationship between the refractive index of the light absorbing layers of the optical recording media No. 1, No. 2 and No. 4 according to the present invention, and the wavelength of the applied semiconductor laser beam in a range of 760 to 800 nm.

Figure 4:
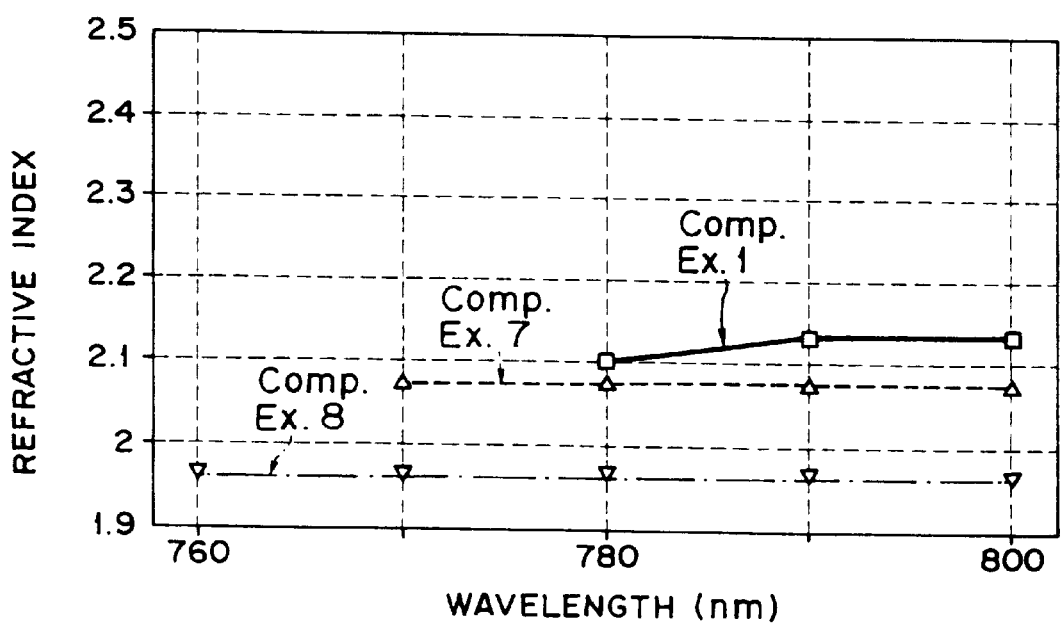
FIG. 4 is a graph which shows the relationship between the wavelength of the applied light and the refractive index of the light absorbing layers obtained in Comparative Examples 1, 7 and 8.

FIG. 4 shows the relationship between the refractive index of the light absorbing layers of the comparative optical recording media No. 1, No. 7 and No. 8, and the wavelength of the applied semiconductor laser beam in a range of 760 to 800 nm.

As can be seen from the results obtained in FIGS. 3 and 4, the refractive index of the light absorbing layers of the optical recording media according to the present invention is higher than that of the comparative optical recording media at a wavelength close to the wavelength of the semiconductor laser beam.

TABLE 1

| Example No. | Metallo-Phthalocyanine Compound | Central Metal | Position of Substituent (in a benzene ring) | Substituent | Nitrogen-containing Compound | Maximum Light Absorption Peak [λmax] (nm) |
|---|---|---|---|---|---|---|
| Ex. 1 | A | Zn | α-position | 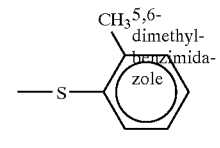 | 5,6-dimethyl-benzimidazole | 730 |
| Ex. 2 | B | Zn | α-position | 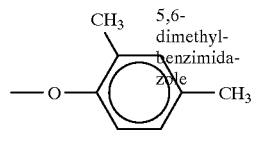 | 5,6-dimethyl-benzimidazole | 715 |
| Ex. 3 | C | Co | α-position | 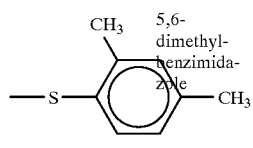 | 5,6-dimethyl-benzimidazole | 710 |
| Ex. 4 | D | Zn | α-position | 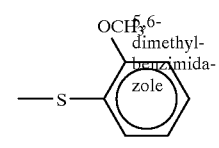 | 5,6-dimethyl-benzimidazole | 730 |
| Ex. 5 | E | Zn | α-position | 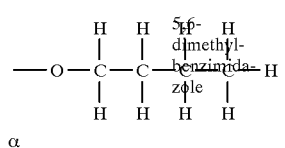 | 5,6-dimethyl-benzimidazole | 715 |

TABLE 1-continued

| Example No. | Metallo-Phthalocyanine Compound | Central Metal | Position of Substituent (in a benzene ring) | Substituent | Nitrogen-containing Compound | Maximum Light Absorption Peak [λmax] (nm) |
|---|---|---|---|---|---|---|
| Ex. 6 | F | Cd | α-position | —O—CH₂—CH₂—H (α) | 5,6-dimethyl-benzimidazole | 720 |
| Comp. Ex. 1 | A | Zn | α-position | —S—C₆H₄(CH₃) (α) | | |
| Comp. Ex. 2 | B | Zn | α-position | —O—C₆H₃(CH₃)₂ (α) | | |
| Comp. Ex. 3 | G | Cu | α-position | —O—C₆H₄—NH—CH(CH₃)₂ (α) | 5,6-dimethyl-benzimidazole | 715 |
| Comp. Ex. 4 | H | Zn | β-position | —O—C₆H₄—CH(CH₃)(CH₂CH₃) (β) | 5,6-dimethyl-benzimidazole | 645 |
| Comp. Ex. 5 | I | Zn | β-position | —C(CH₃)₃ (β) | 5,6-dimethyl-benzimidazole | 685 |
| Comp. Ex. 6 | J | Cu | β-position | —C(CH₃)₃ (β) | 5,6-dimethyl-benzimidazole | 620 |
| Comp. Ex. 7 | G | Cu | α-position | —O—C₆H₄—NH—CH(CH₃)(CH₂CH₃) (α) | — | |

TABLE 1-continued

| Example No. | Metallo-Phthalocyanine Compound | Central Metal | Position of Substituent (in a benzene ring) | Substituent | Nitrogen-containing Compound | Maximum Light Absorption Peak [λmax] (nm) |
|---|---|---|---|---|---|---|
| Comp. Ex. 8 | I | Zn | β-position | β | 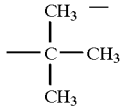 | |

EXAMPLE 7

Formation of Light Absorbing Layer

Guide grooves with a depth of about 1200 Å were provided on the surface of a disk-shaped polycarbonate substrate with a diameter of 120 mm and a thickness of 1.2 mm.

A mixture of the metallo-phthalocyanine compound (A) as shown in Table 1 and 5,6-dimethylbenzimidazole with a molar ratio of 1:1 was dissolved in a solvent comprising as the main component ethyl cellosolve, so that a coating liquid for the light absorbing layer was prepared. The coating liquid thus prepared was coated on the disk-shaped substrate by spin coating, so that a light absorbing layer with thickness of about 1500 Å was provided on the substrate.

Formation of Light Reflection Layer

Au was deposited on the above prepared light absorbing layer by sputtering, so that a light reflection layer with a thickness of about 800 Å was provided on the light absorbing layer.

Formation of Protective Layer

On the above prepared light reflection layer, a protective layer with a thickness of about 5 μm, comprising an ultraviolet curing resin was provided.

Thus, an optical recording medium No. 7 according to the present invention was fabricated.

EFM signals were recorded in the above prepared optical recording medium No. 7 under the conditions that the wavelength of the signal was 785 nm, the numerical aperture (N.A.) was 0.5, and the recording linear velocity was 1.4 m/sec. The thus recorded signals were reproduced from the optical recording medium.

The evaluation was made in accordance with Red Book of the CD standards, and the results were as follows:

$I_{top}$: 65%

CI error: 220 or less

As can be seen from the results, the CD standards were satisfied.

EXAMPLE 8

The procedure for fabricating the optical recording medium No. 7 of the present invention in Example 7 was repeated except that the metallo-phthalocyanine compound (A) for use in the light absorbing layer coating liquid employed in Example 7 was replaced by the metallo-phthalocyanine compound (B) as shown in Table 1.

Thus, an optical recording medium No. 8 according to the present invention was fabricated.

Using the above prepared optical recording medium No. 8, the same recording and reproducing test as conducted in Example 7 was carried out.

The evaluation was made in accordance with Red Book of the CD standards, and the results were as follows:

$I_{top}$: 72%

CI error: 220 or less

As can be seen from the results, the CD standards were satisfied.

COMPARATIVE EXAMPLE 9

The procedure for fabricating the optical recording medium No. 7 of the present invention in Example 7 was repeated except that 5,6-dimethylbenzimidazole as employed in Example 7 was not used in the preparation of the coating liquid for the light absorbing layer.

Thus, a comparative optical recording medium No. 9 was fabricated.

Using the above prepared comparative optical recording medium No. 9, the same recording and reproducing test as conducted in Example 7 was carried out.

The evaluation was made in accordance with Red Book of the CD standards, and the results were as follows:

$I_{top}$: 38%

CI error: 220 or more

As can be seen from the results, the CD standards were not satisfied.

COMPARATIVE EXAMPLE 10

The procedure for fabricating the optical recording medium No. 7 of the present invention in Example 7 was repeated except that the metallo-phthalocyanine compound (A) for use in the light absorbing layer coating liquid employed in Example 7 was replaced by the metallo-phthalocyanine compound (G) as shown in Table 1.

Thus, a comparative optical recording medium No. 10 was fabricated.

Using the above prepared comparative optical recording medium No. 10, the same recording and reproducing test as conducted in Example 7 was carried out.

The evaluation was made in accordance with Red Book of the CD standards, and the results were as follows:

$I_{top}$: 40%

CI error: 220 or more

As can be seen from the results, the CD standards were not satisfied.

EXAMPLE 9

A mixture of the metallo-phthalocyanine compound (a) (the same as employed in Example 12) as shown in Table 2 and 1-tetramethylbenzylbenzimidazole with a molar ratio of 1:1.2 was dissolved in chloroform to prepare a coating liquid for the light absorbing layer.

The coating liquid thus prepared was coated on a disk-shaped glass substrate with a diameter of 120 mm and a thickness of 1.2 mm by spin coating, whereby a light absorbing layer was provided on the glass substrate, and an optical recording medium No. 9 of the present invention was fabricated.

Figure 5:
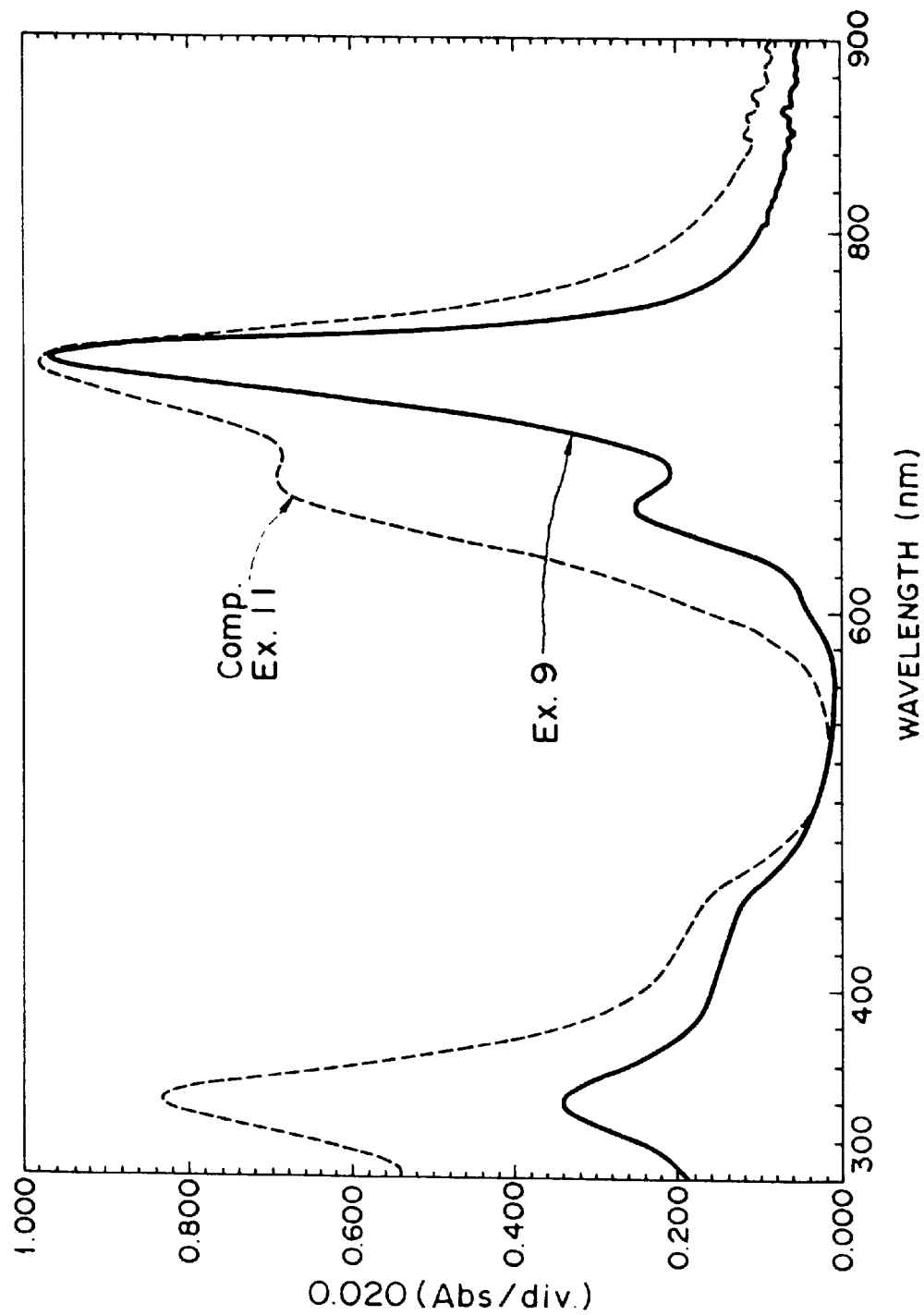
FIG. 5 shows light absorption spectra of the light absorbing layers obtained in Example 9 and Comparative Example 11.

A light absorption spectrum of the light absorbing layer of the above prepared recording medium No. 9 is shown in FIG. 5. As apparent from the graph, the absorption peak on the right side, which is a longer wavelength side, is high and sharp.

COMPARATIVE EXAMPLE 11

The metallo-phthalocyanine compound (a) (the same as employed in Example 12) as shown in Table 2 was dissolved in chloroform to prepare a coating liquid for the light absorbing layer.

The coating liquid thus prepared was coated on a disk-shaped glass substrate with a diameter of 120 mm and a thickness of 1.2 mm by spin coating, whereby a light absorbing layer was provided on the glass substrate, and a comparative optical recording medium No. 11 was fabricated.

A light absorption spectrum of the light absorbing layer of the above prepared comparative optical recording medium No. 11 is shown in FIG. 5, which indicates that the absorption peak is broader than that of the light absorbing layer obtained in Example 9.

EXAMPLE 10

The procedure for fabricating the optical recording medium No. 9 of the present invention in Example 9 was repeated except that the metallo-phthalocyanine compound (a) for use in the light absorbing layer coating liquid employed in Example 9 was replaced by a metallo-phthalocyanine compound (d) (the same as employed in Example 15) as shown in Table 2.

Thus, an optical recording medium No. 10 according to the present invention was fabricated.

Figure 6:
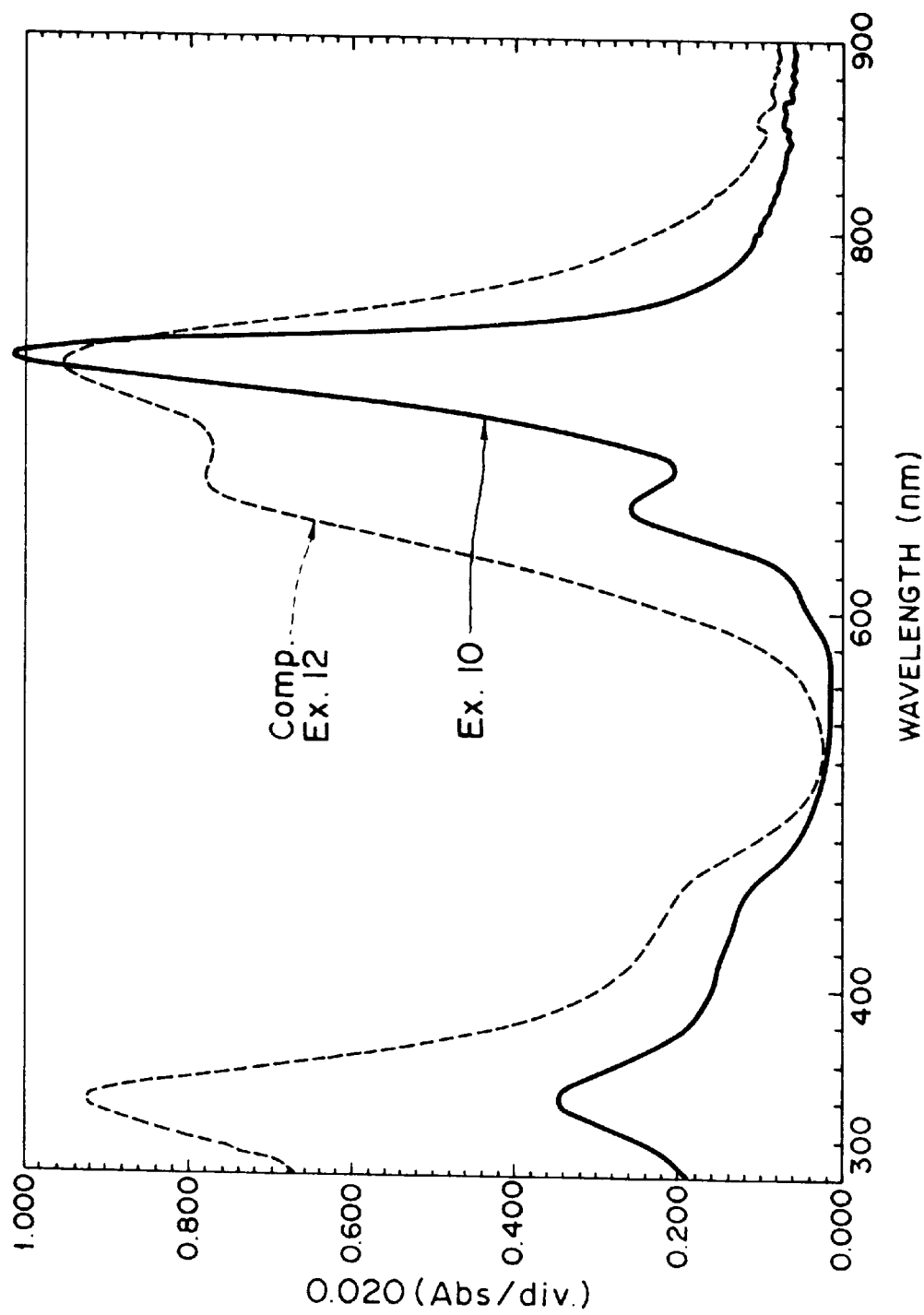
FIG. 6 shows light absorption spectra of the light absorbing layers obtained in Example 10 and Comparative Example 12.

A light absorption spectrum of the light absorbing layer of the above prepared optical recording medium No. 10 is shown in FIG. 6. As apparent from the graph, the absorption peak on the right side, which is a longer wavelength side, is high and sharp.

COMPARATIVE EXAMPLE 12

The procedure for fabricating the comparative optical recording medium No. 11 in Comparative Example 11 was repeated except that the metallo-phthalocyanine compound (a) for use in the light absorbing layer coating liquid employed in Comparative Example 11 was replaced by metallo-phthalocyanine compound (d) (the same as employed in Example 15) as shown in Table 2.

Thus, a comparative optical recording medium No. 12 was fabricated.

A light absorption spectrum of the light absorbing layer of the above prepared comparative optical recording medium No. 12 is shown in FIG. 6. As apparent from the graph, the absorption peak on the right side, which is a longer wavelength side, is broader than that of the light absorbing layer obtained in Example 10.

EXAMPLE 11

The procedure for fabricating the optical recording medium No. 9 of the present invention is Example 9 was repeated except that the metallo-phthalocyanine compound (a) for use in the light absorbing layer coating liquid employed in Example 9 was replaced by a metallo-phthalocyanine compound (g) (the same as employed in Example 18) as shown in Table 2.

Thus, an optical recording medium No. 11 according to the present invention was fabricated.

A light absorption spectrum of the light absorbing layer of the above prepared optical recording medium No. 11 is shown in FIG. 7. As apparent from the graph, the absorption peak on the right side, which is a longer wavelength side, is high and sharp.

COMPARATIVE EXAMPLE 13

The procedure for fabricating the comparative optical recording medium No. 11 in Comparative Example 11 was repeated except that the metallo-phthalocyanine compound (a) for use in the light absorbing layer coating liquid employed in Comparative Example 11 was replaced by metallo-phthalocyanine compound (g) (the same as employed in Example 18) as shown in Table 2.

Thus, a comparative optical recording medium No. 13 was fabricated.

A light absorption spectrum of the light absorbing layer of the above prepared comparative optical recording medium No. 13 is shown in FIG. 7. As apparent from the graph, the absorption peak on the right side, which is a longer wavelength side, is broader than that of the light absorbing layer obtained in Example 11.

EXAMPLES 12 TO 27 AND COMPARATIVE EXAMPLES 14 AND 15

A mixture of each of the metallo-phthalocyanine compounds (a) to (r) as shown in Tables 2 and 3 and 5,6-dimethylbenzimidazole with a molar ratio of 1:2 was dissolved in chloroform to prepare a coating liquid for the light absorbing layer.

The coating liquid thus prepared was coated on a disk-shaped glass substrate with a diameter of 120 mm and a thickness of 1.2 mm by spin coating, whereby a light absorbing layer was provided on the glass substrate.

Thus, optical recording media Nos. 12 to 27 according to the present invention and comparative optical recording media Nos. 14 and 15 were fabricated.

Then, a maximum light absorption peak ($\lambda$max) of the light absorbing layer of each of the optical recording media obtained in Examples 12 to 27 and Comparative Examples 14 to 15 was obtained. The results are shown in Tables 2 and 3.

In addition, a mixture of each metallo-phthalocyanine compound and 5,6-dimethylbenzimidazole was dissolved in a mixed solvent prepared by selectively employing alcohols (methanol and ethanol), cellosolves (2-ethoxyethanol and 2-methoxyethanol) and alkanes (methylcyclohexane and cyclohexane), which was employed as a solvent for spin coating to apply the coating liquid for a light absorbing layer to a polycarbonate substrate. Thus, the film-forming properties due to the solubility of each metallo-phthalocyanine compound were evaluated. The results are shown in Table 2.

Furthermore, using the optical recording media Nos. 12, 16 and 27, the heat resistance of each light absorbing layer was evaluated by measuring the absorbance [Abs] ($\lambda$max) of the light absorbing layer at the initial stage and after the storage at 120° C. for 200 hours. The heat resistance of the light absorbing layer was expressed by the ratio of the absorbance [Abs (λmax)] obtained after the storage at 120° C. for 200 hours to that obtained at the initial stage. The results are shown in Table 2.

on the disk-shaped substrate by spin coating, so that a light absorbing layer with a thickness of about 1500 Å was provided on the substrate.

TABLE 2

| Example No. | Metallophthalocyanine Compound | Central Metal | Substituent (Phenylthio Group) | | | | | Maximum Light Absorption Peak [λmax] (nm) | Film-forming Properties [NOTE] | Heat Resistance |
|---|---|---|---|---|---|---|---|---|---|---|
| | | | $R^1$ | $R^2$ | $R^3$ | $R^4$ | $R^5$ | | | |
| Ex. 12 | (a) | Zn | $CH_3$ | H | H | H | H | 728 | o | 0.8 |
| Ex. 13 | (b) | Zn | $CH_3$ | H | $CH_3$ | H | H | 730 | o | |
| Ex. 14 | (c) | Zn | $CH_3$ | H | H | H | $CH_3$ | 730 | o | |
| Ex. 15 | (d) | Zn | $CH_3$ | H | H | $CH_3$ | H | 728 | o | |
| Ex. 16 | (e) | Zn | $CH_3$ | H | $CH_3$ | H | $CH_3$ | 732 | o | 0.95 |
| Ex. 17 | (f) | Zn | $CH_3$ | H | —Br | H | H | 722 | o | |
| Ex. 18 | (g) | Zn | $CH(CH_3)_2$ | H | H | H | H | 727 | o | |
| Ex. 19 | (h) | Zn | $OCH_3$ | H | H | H | H | 730 | o | |
| Ex. 20 | (i) | Zn | $OCH(CH_3)_2$ | H | H | H | H | 727 | o | |
| Ex. 21 | (j) | Zn | $OC_2H_5$ | H | H | H | $OC_2H_5$ | 735 | o | |
| Ex. 22 | (k) | Zn | $OC_2H_5$ | H | H | $OC_2H_5$ | H | 727 | o | |
| Ex. 23 | (l) | Zn | $OC_2H_4OC_2H_5$ | H | H | H | H | 725 | o | |
| Ex. 24 | (m) | Zn | $CF_3$ | H | H | H | H | 718 | x | |
| Ex. 25 | (n) | Zn | $COOC_2H_5$ | H | H | H | H | 716 | o | |
| Ex. 26 | (o) | Zn | F | H | H | H | F | 719 | x | |
| Ex. 27 | (p) | Zn | H | H | n-$C_{12}H_{25}$ | H | H | 726 | o | 0.53 |

[NOTE]
o --- A coating liquid for the light absorbing layer was uniformly coated on the substrate, and the disc characteristics of the obtained optical recording medium were satisfied.
x --- The light absorbing layer was not uniformly provided on the substrate, so that the disc characteristics were unsatisfactory.

TABLE 3

| Example No. | Metallo-Phthalocyanine Compound | Central Metal | Position of Substituent (in a benzene ring) | Substituent | Maximum Light Absorption Peak [λ max] (nm) |
|---|---|---|---|---|---|
| Comp. Ex. 14 | (q) | Zn | β-position | Tetra tertbutyl | 692 |
| Comp. Ex. 15 | (r) | Cu | β-position | Tetra tertbutyl | 620 |

As can be seen from the results in Tables 2 and 3, the maximum light absorption peak (λmax) of the light absorbing layer of each of the optical recording media obtained in Examples 12 to 27 is within a range of 710 to 750 nm.

In particular, the optical recording media obtained in Examples 12 to 23 were excellent from the viewpoints of the film-forming properties of the light absorbing layer and the heat resistance thereof. In addition, the maximum light absorption peak (λmax) of the light absorbing layer of each of the optical recording media obtained in Examples 12 to 23 is within a range of 720 to 740 nm.

EXAMPLE 28

Formation of Light Absorbing Layer

Guide grooves with a depth of about 1200 Å were provided on the surface of a disk-shaped polycarbonate substrate with a diameter of 120 mm and a thickness of 1.2 mm.

A mixture of the metallo-phthalocyanine compound (c) as shown in Table 2 (the same as employed in Example 14) and 5,6-dimethylbenzimidazole with a molar ratio of 1:1 was dissolved in a mixed solvent comprising ethyl cellosolve, tetrahydrofuran and methylcyclohexane at a mixing ratio of 1:1:6, so that a coating liquid for the light absorbing layer was prepared. The coating liquid thus prepared was coated Formation of Light Reflection Layer Au was deposited on the above prepared light absorbing layer by sputtering, so that a light reflection layer with a thickness of about 800 Å was provided on the light absorbing layer.

Formation of Protective Layer

On the above prepared light reflection layer, a protective layer with a thickness of about 5 μm, comprising an ultraviolet curing resin was provided.

Thus, an optical recording medium No. 28 according to the present invention was fabricated.

EFM signals were recorded in the above prepared optical recording medium No. 28 under the conditions that the wavelength of the signal was 785 nm, the numerical aperture (N.A.) was 0.5, and the recording linear velocity was 1.4 m/sec. The thus recorded signals were reproduced from the optical recording medium.

The evaluation was made in accordance with Red Book of the CD standards, and the results were as follows:

$I_{top}$: 69%
CI error: 220 or less

As can be seen from the results, the CD standards were satisfied.

As previously mentioned, since the light absorbing layer of the optical recording medium according to the present invention comprises as the main components the metallo-phthalocyanine compound of formula (I) and the nitrogen-containing compound, the association of the molecules of the metallo-phthalocyanine compound can be inhibited in the light absorbing layer, thereby exhibiting the excellent optical properties, that is, a proper double refractive index at the wavelength of the laser beam in a range of 760 to 800 nm.

When a nitrogen atom of the nitrogen-containing compound for use in the light absorbing layer is included in a heterocyclic ring, the association of the molecules of the phthalocyanine compound can be more effectively inhibited, and the durability of the optical recording medium, in terms of the heat resistance and light resistance, can be improved.

It is preferable that the light absorbing layer of the optical recording medium of the present invention exhibit a maximum light absorption peak in a wavelength range of 710 to 750 nm. This is because the proper double refractive index can be surely obtained when the laser beam in applied thereto.

Furthermore, the optical recording medium can be easily fabricated in a stable condition by the fabrication method of the present invention.

According to the present invention, when the metallo-phthalocyanine compound of formula (I) has —SR group as a substituent situated at one of the α-positions of each benzene ring, a phenylthio group of formula (II) is preferably employed as the —SR group. In this case, the light absorbing layer of the optical recording medium can exhibit a maximum light absorption peak in a wavelength range of 720 to 740 nm. In addition, the solubility of the metallo-phthalocyanine compound in a solvent for use in spin coating is increased, so that the film-forming properties of a light absorbing layer are improved. Furthermore, when at least one nitrogen-containing compound selected from the group consisting of imidazole, benzimidazole and thiazole derivative is employed in combination with the metallo-phthalocyanine compound of formula (I), the association of molecules of the phthalocyanine compound can be inhibited effectively and the durability of the recording medium can be further improved.

Japanese Patent Application No. 6-104500 filed on Apr. 20, 1994, Japanese Patent Application No. 6-151482 filed on Jun. 9, 1994, and Japanese Patent Application No. 6-214247 filed on Aug. 16, 1994 are hereby incorporated by reference.

What is claimed is:

1. An optical recording medium comprising a substrate and a light absorbing layer formed on said substrate, said light absorbing layer comprising:

(i) a metallo-phthalocyanine compound of formula (I):

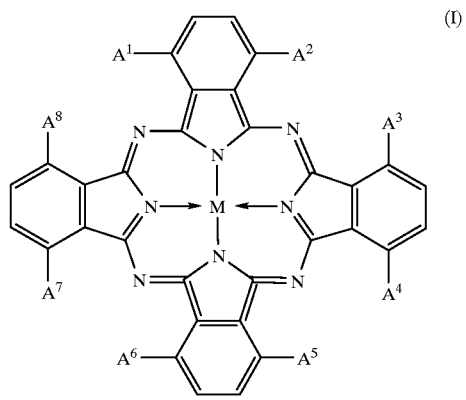

wherein M in Mn, Fe, Co, Zn or Cd;
one of $A^1$ or $A^2$ is hydrogen, one of $A^3$ or $A^4$ is hydrogen, one of $A^5$ or $A^6$ is hydrogen, one of $A^7$ or $A^8$ is hydrogen and the other, non-hydrogen moiety, is an —OR group or an —SR group in which R is an aliphatic aromatic or alicyclic hydrocarbon group; and (ii) a nitrogen-containing compound capable of coordinating to M and inhibiting association of compounds of formula (I), selected from the group consisting of n-butylamine, n-hexylamine, t-butylamine, ethylenediamine, trimethylamine, dimethylformamide, N,N-dimethylformamide, pyrrole, pyrrolidine, imidazole, benzimidazole, methylbenzimidazole, dimethylbenzimidazole, 5,6-dimethylbenzimidazole, trimethylbenzimidazole, 2,5,6-trimethylbenzimidazole, pyridine, piperidine, carbazole, quinoline, isoquinoline, quinoxaline, benzoquinoline, phenanthridine, indoline, 7-azaindole, tetrahydroquinoline, benzotriazole, 5-chlorobenzotriazole, 5-chlorotriazole, triphenylimidazole, benzisoquinoline-5,10-dione, phthalimide, 1(2H)phthalazinone, N,N'-phthalylhydrazine, 1,3-diiminoisoindoline, tetrabromophthalimide, oxazole, benzoxazole, norharman, triazine, trichloroquinoxaline, azobenzene, 2-methylnapthoimidazole, benzothiazole, perimidine, polybenzimidazole, polyimidazole and polythiazole, each of which may be a substituent; wherein said light absorbing layer exhibits a maximum light absorption peak (λmax) in a wavelength range of 710 to 750 nm.

2. The optical recording medium as claimed in claim 1, wherein said nitrogen-contained compound, (ii) is selected from the group consisting of pyrrole, pyrrolidine, imidazole, benzimidazole, methylbenzimidazole, dimethylbenzimidazole, 5,6-dimethylbenzimidazole, trimethylbenzimidazole, 2,5,6-trimethylbenzimidazole, pyridine, piperidine, carbazole, quinoline, isoquinoline, quinoxaline, benzoquinoline, phenanthridine, indoline, 7-azaindole, tetrahydroquinoline, benzotriazole, 5-chlorobenzotriazole, 5-chlorotriazole, triphenylimidazole, benzisoquinoline-5,10-dione, phthalimide, 1(2H) phthalazinone, N,N'-phthalylhydrazine, 1,3-diiminoisoindoline, tetrabromophthalimide, oxazole, benzoxazole, norharman, triazine, trichloroquinoxaline, azobenzene, 2-methylnapthoimidazole, benzothiazole, perimidine, polybenzimidazole, polyimidazole and polythiazole.

3. The optical recording medium as claimed in claim 1, wherein said —SR group for use in said metallophthalocyanine compound of formula (I) is a phenylthio group of formula (II):

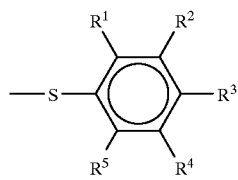

(II)

wherein $R^1$ is an alkyl group having 1 to 4 carbon atoms or an alkoxyl group having 1 to 4 carbon atoms; and $R^2$, $R^3$, $R^4$ and $R^5$ each is an alkyl group having 1 to 4 carbon atoms, an alkoxyl group having 1 to 4 carbon atoms, a halogen atom or hydrogen.

4. The optical medium as claimed in claim 3, wherein said nitrogen-containing compound (ii) is selected from the group consisting of pyrrole, pyrrolidine, imidazole, benzimidazole, methylbenzimidazole, dimethylbenzimidazole, 5,6-dimethylbenzimidazole, trimethylbenzimidazole, 2,5,6-trimethylbenzimidazole, pyridine, piperidine, carbazole, quinoline, isoquinoline, quinoxaline, benzoquinoline, phenanthridine, indoline, 7-azaindole, tetrahydroquinoline, benzotriazole, 5-chlorobenzotriazole, 5-chlorotriazole, triphenylimidazole, benzisoquinoline-5,10-dione, phthalimide, 1(2H) phthalazinone, N,N'-phthalylhydrazine, 1,3-diiminoisoindoline, tetrabromophthalimide, oxazole, benzoxazole, norharman, triazine, trichloroquinoxaline, azobenzene, 2-methylnapthoimidazole, benzothiazole, perimidine, polybenzimidazole, polyimidazole and polythiazole.

5. The optical recording medium as claimed in claim 4, wherein the nitrogen-containing compound (ii) is selected from the group consisting of imidazole, benzimidazole and thiazole derivative.

6. The optical recording medium as claimed in claim 3, wherein the light absorbing layer exhibits a maximum light absorption peak (λmax) in a wavelength range of 720 to 740 nm.

7. A method of producing an optical recording medium comprising a substrate, and a light absorbing layer formed thereon, comprising (i) a metallo-phthalocyanine compound of formula (I) and (ii) a nitrogen-containing compound, which method comprises the step of:

providing said light absorbing layer on said substrate by coating of a mixture comprising (i) said metallo-phthalocyanine compound of formula (I):

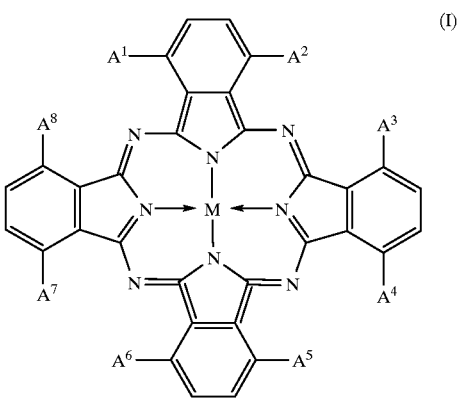

(I)

wherein M is Mn, Fe, Co, Zn or Cd;

one of $A^1$ or $A^2$ is hydrogen, one of $A^3$ or $A^4$ is hydrogen, one of $A^5$ or $A^6$ is hydrogen, one of $A^7$ or $A^8$ is hydrogen and the other, non-hydrogen moiety, is an —OR group or an —SR group in which R is an aliphatic aromatic or alicyclic hydrocarbon group; and (ii) a nitrogen-containing compound capable of coordinating to M and inhibiting association of compounds of formula (I), selected from the group consisting of n-butylamine, n-hexylamine, t-butylamine, ethylenediamine, trimethylamine, dimethylformamide, N,N-dimethylformamide, pyrrole, pyrrolidine, imidazole, benzimidazole, methylbenzimidazole, dimethylbenzimidazole, 5,6-dimethylbenzimidazole, trimethylbenzimidazole, 2,5,6-trimethylbenzimidazole, pyridine, piperidine, carbazole, quinoline, isoquinoline, quinoxaline, benzoquinoline, phenanthridine, indoline, 7-azaindole, tetrahydroquinoline, benzotriazole, 5-chlorobenzotriazole, 5-chlorotriazole, triphenylimidazole, benzisoquinoline-5,10-dione, phthalimide, 1(2H)phthalazinone, N,N'-phthalylhydrazine, 1,3-diiminoisoindoline, tetrabromophthalimide, oxazole, benzoxazole, norharman, triazine, trichloroquinoxaline, azobenzene, 2-methylnapthoimidazole, benzothiazole, perimidine, polybenzimidazole, polyimidazole and polythiazole, each of which may be a substituent; wherein said light absorbing layer exhibits a maximum light absorption peak (λmax) in a wavelength range of 710 to 750 nm.

8. The method of producing said optical recording medium as claimed in claim 7, further comprising the step of providing an undercoat layer between said substrate and said light absorbing layer by coating method.

9. The method of producing said optical recording medium as claimed in claim 7, further comprising the step of providing alight reflection layer on said light absorbing layer by vacuum deposition.

10. The method of producing said optical recording medium as claimed in claim 9, further comprising the step of providing a protective layer on said light reflection layer by vacuum deposition or coating method.

11. The method of producing said optical recording medium as claimed in claim 7, wherein said —SR group for use in said metallo-phthalocyanine compound of formula (I) is a phenylthio group of formula (II):

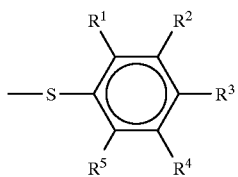

(II)

wherein $R^1$ is an alkyl group having 1 to 4 carbon atoms or an alkoxyl group having 1 to 4 carbon atoms; and $R^2$, $R^3$, $R^4$ and $R^5$ each is an alkyl group having 1 to 4 carbon atoms, an alkoxyl group having 1 to 4 carbon atoms, a halogen atom or hydrogen.

12. The method of producing said optical recording medium as claimed in claim 11, further comprising the step of providing an undercoat layer between said substrate and said light absorbing layer by coating method.

13. The method of producing said optical recording medium as claimed in claim 11, further comprising the step of providing a light reflection layer on said light absorbing layer by vacuum deposition.

14. The method of producing said optical recording medium as claimed in claim 13, further comprising the step of providing a protective layer on said light reflection layer by vacuum deposition or coating method.

* * * * *

UNITED STATES PATENT AND TRADEMARK OFFICE
CERTIFICATE OF CORRECTION

PATENT NO. : 5,968,708
DATED : October 19, 1999
INVENTOR(S) : Toru Yashiro et al.

It is certified that error appears in the above-identified patent and that said Letters Patent is hereby corrected as shown below:

Column 1,
Line 36, delete "CD" and insert -- CDs --.

Column 4,
Line 54, delete "therein," and insert -- thereon, --.

Column 5,
Line 62, delete "polymimidazole" and insert -- polyimidazole --.

Column 7,
Line 43, delete "methacrylater," and insert -- methacrylate, --.

Table I, delete table in its entirety, and insert

Table 1

| Example No. | Metallo-Phthalo-cyanine Compound | Central Metal | Position of Substituent (in a benzene ring) | Substituent | Nitrogen-containing Compound | Maximum Light Absorption Peak [λmax] (nm) |
|---|---|---|---|---|---|---|
| Ex. 1 | A | Zn | α-position |  | 5,6-dimethyl-benzimidazole | 730 |
| Ex. 2 | B | Zn | α-position |  | * | 715 |
| Ex. 3 | C | Co | α-position |  | * | 710 |
| Ex. 4 | D | Zn | α-position |  | * | 730 |

UNITED STATES PATENT AND TRADEMARK OFFICE
CERTIFICATE OF CORRECTION

PATENT NO. : 5,968,708
DATED : October 19, 1999
INVENTOR(S) : Toru Yashiro et al.

It is certified that error appears in the above-identified patent and that said Letters Patent is hereby corrected as shown below:

Table 1 (continued)

| Example No. | Metallo-Phthalo-cyanine Compound | Central Metal | Position of Substituent (in a benzene ring) | Substituent | Nitrogen-containing Compound | Maximum Light Absorption Peak ($\lambda_{max}$) (nm) |
|---|---|---|---|---|---|---|
| Ex. 5 | E | Zn | α-position | -O-C-C-C-C-H (with H substituents) | - | 715 |
| Ex. 6 | F | Cd | α-position | -O-C-C-C-C-H (with H substituents) | - | 720 |
| Comp. Ex. 1 | A | Zn | α-position | -S-phenyl-CH$_3$ | - | - |
| Comp. Ex. 2 | B | Zn | α-position | -O-phenyl(CH$_3$)-CH$_3$ | - | - |
| Comp. Ex. 3 | G | Cu | α-position | -O-phenyl-HN-CH(CH$_3$)-CH$_2$-CH$_3$ | 5,6-dimethyl-benzimidazole | 715 |
| Comp. Ex. 4 | H | Zn | β-position | -O-phenyl-CH(CH$_3$)(CH$_2$CH$_3$) | - | 645 |

UNITED STATES PATENT AND TRADEMARK OFFICE
CERTIFICATE OF CORRECTION

PATENT NO. : 5,968,708
DATED : October 19, 1999
INVENTOR(S) : Toru Yashiro et al.

Page 3 of 3

It is certified that error appears in the above-identified patent and that said Letters Patent is hereby corrected as shown below:

Table 1 (continued)

| | | | | | | |
|---|---|---|---|---|---|---|
| Comp. Ex. 5 | I | Zn | B-position | -C(CH$_3$)$_3$ | • | 685 |
| Comp. Ex. 6 | J | Cu | B-position | -C(CH$_3$)$_3$ | • | 620 |
| Comp. Ex. 7 | G | Cu | α-position | -O-C$_6$H$_4$-CH(CH$_3$)-CH$_2$-CH$_3$ | - | |
| Comp. Ex. 8 | I | Zn | B-position | -C(CH$_3$)$_3$ | • | |

Column 24,
Line 58, delete "alight" and insert -- a light --.

Signed and Sealed this

Fourth Day of December, 2001

Attest:

*Nicholas P. Godici*

NICHOLAS P. GODICI
*Attesting Officer*  *Acting Director of the United States Patent and Trademark Office*